United States Patent [19]

Sasamoto

[11] Patent Number: 5,982,782
[45] Date of Patent: Nov. 9, 1999

[54] COMMON RESOURCE ASSIGNING METHOD FOR MOBILE COMMUNICATION SYSTEM

[75] Inventor: Yoshifumi Sasamoto, Tokyo, Japan

[73] Assignee: NEC Corporation, Tokyo, Japan

[21] Appl. No.: 08/855,508

[22] Filed: May 13, 1997

[30] Foreign Application Priority Data

May 13, 1996 [JP] Japan ................................. 8-142218

[51] Int. Cl.$^6$ ............................ H04B 7/216; H04Q 7/00; H04J 3/16
[52] U.S. Cl. ...................... 370/465; 370/320; 370/329; 370/335; 370/342
[58] Field of Search .................................. 370/465, 331, 370/336, 337, 329, 345, 328, 320, 326, 335, 342, 350

[56] References Cited

U.S. PATENT DOCUMENTS

| | | | |
|---|---|---|---|
| 5,184,347 | 2/1993 | Farwell et al. | 370/94.1 |
| 5,195,090 | 3/1993 | Bolliger et al. | 370/94.1 |
| 5,195,091 | 3/1993 | Farwell et al. | 370/94.1 |
| 5,278,892 | 1/1994 | Bolliger et al. | 379/60 |
| 5,305,308 | 4/1994 | English et al. | 370/32.1 |
| 5,434,853 | 7/1995 | Hemmady et al. | 370/60 |
| 5,434,854 | 7/1995 | Focarile et al. | 370/60 |
| 5,438,565 | 8/1995 | Hemmady et al. | 370/60 |
| 5,526,397 | 6/1996 | Lohman | 379/58 |
| 5,627,830 | 5/1997 | Kotzin | 370/336 |
| 5,652,748 | 7/1997 | Jolma et al. | 370/320 |

OTHER PUBLICATIONS

AT&T, "AAL for Short Packets–Multiplexed AALx", ITU–T/SG–13, D899, Jul. 1995.
AT&T, "AAL for Short Packets–AALx", ITU–T/SG–13, D900, Jul. 1995.

Primary Examiner—Michael Horabik
Assistant Examiner—Man Phan
Attorney, Agent, or Firm—Foley & Lardner

[57] ABSTRACT

A common resource assigning method is used for a mobile communication system constituted by a plurality of radio base stations and a center station connected to the radio base stations and having a plurality of speech processing mechanisms. In this method, speech frame groups are set by grouping speech frames having different phases on radio interfaces. The speech processing mechanisms are related with the set frame groups. Speech channels are formed by using the speech frame groups in the radio base stations and the specific speech processing mechanisms related thereto.

5 Claims, 4 Drawing Sheets

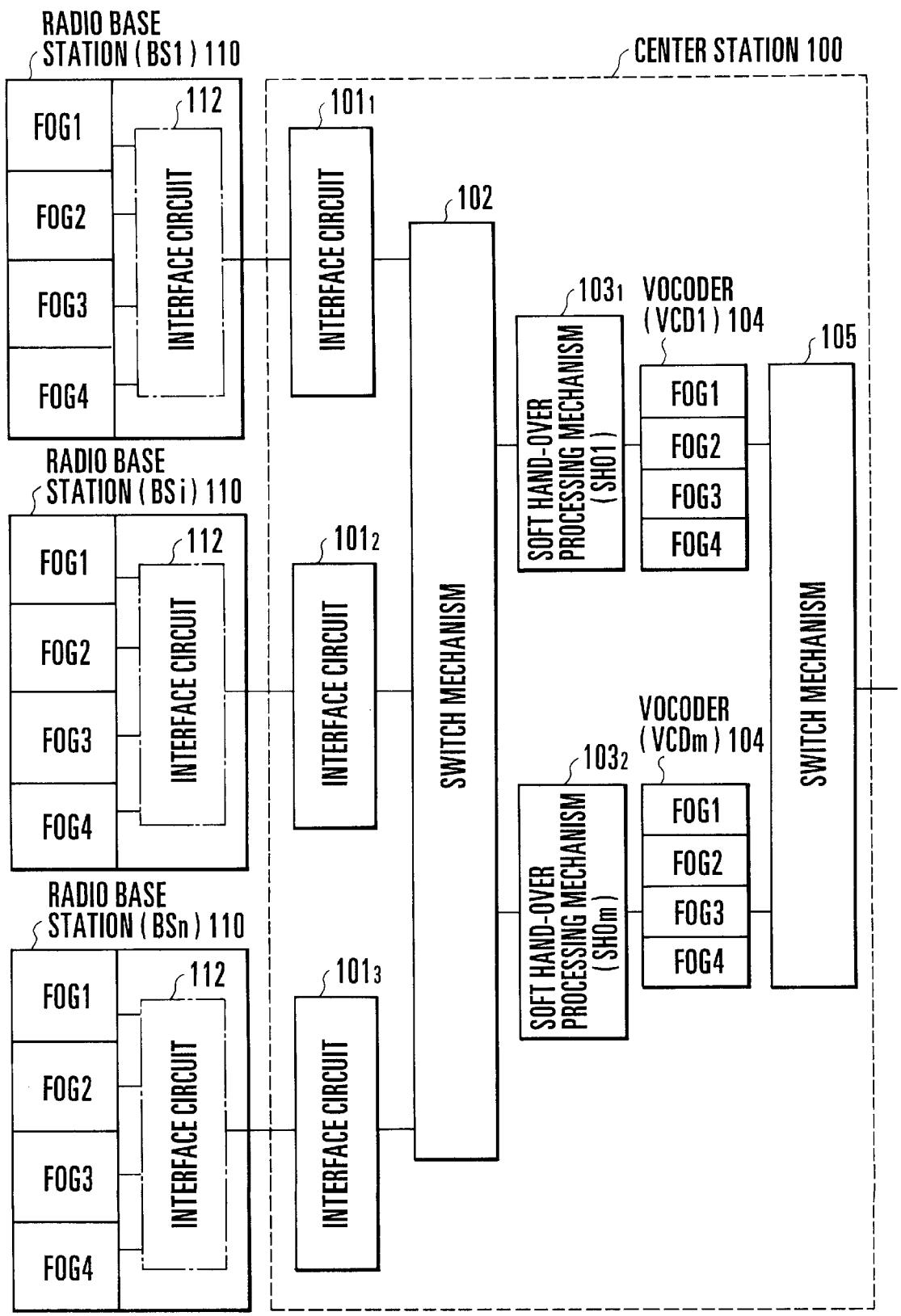
F I G. 1

COMMON RESOURCE ASSIGNING METHOD FOR MOBILE COMMUNICATION SYSTEM

BACKGROUND OF THE INVENTION

The present invention relates to a mobile communication resource assigning method and, more particularly, to a method of assigning resources such as soft hand-over processing mechanisms in the speech processing mechanisms of a mobile communication system, e.g., vocoders (VOICE CODERS) and CDMA (Code Division Multiple Access).

In a mobile communication system, in order to effectively use radio resources, speech codes of a low bit rate are used, and voice codecs, i.e., vocoders, are required.

In a mobile communication system using TDMA (Time Division Multiple Access), in order to increase the utilization efficiency of the transmission path between each base station and the center station, vocoders are arranged in the center station in one-to-one correspondence with radio channels on transmission paths, and time division multiplexing is performed between a plurality of channels of a low bit rate.

In a conventional scheme, these vocoders are generally prepared in number corresponding to the number of channels in radio base stations. For this reason, the number of vocoders required is equal to or larger than the number corresponding to the communication traffic, resulting in an increase in cost.

In a system which performs soft hand-over for speech frames as in CDMA, a soft hand-over processing mechanism for performing selective synthesis between a plurality of speech frames is required. Note that in a CDMA scheme, soft hand-over indicates that a mobile radio telephone moving from one cell area to another cell area is simultaneously communicating with the two cells through the same radio channel. In this case, in soft hand-over processing, redundant communication data received by one mobile telephone from two cells must be transmitted to a common call processing point in the system upon selecting a communication path, one of the communication data must be selected in real time while the other communication data is discarded, the reply must be copied to be sent to the two cells upon selecting communication paths, and the operations of the two cells must be harmonized with each other to simultaneously transmit the redundant replies to the mobile telephone.

In addition, a speech frame having a frame length of a variable rate is used in accordance with a speech state. For example, QCELP used by IS-95 of the TIA (Telecommunication Industry Association) standards is available.

Such a CDMA system uses a resources sharing method of performing transmission between each base station and the center station according to a frame relay scheme, and allowing an arbitrary relationship to be set between radio channels, vocoders, and hand-over mechanisms, as disclosed in U.S. Pat Nos. 5,305,308, 5,195,090, 5,278,892, 5,195,091, and 5,184,347.

When the frame relay scheme or ATM (Asynchronous Transfer Mode) is used to perform transmission at a low bit rate, the ratio of additional information such as a header to actual speech information increases, resulting in a deterioration in efficiency in the transmission path.

In order to solve this problem, a composite cell scheme of multiplexing a plurality of speech frames on one ATM cell has been proposed, as in ITU/SG-13 (ITU-T/SG-13, D899 and D900, July 1995).

As described above, in the above conventional scheme, the following problems are posed.

The first problem is that when speech frames are to be transmitted between each base station and the center station according to the packet scheme, the transmission delay varies. When transmission is performed by time division multiplex as in a TDMA system, once a multiplexing point is set, almost no delay occurs during communication. When transmission is performed by the packet scheme, queues and processing mechanisms therefor are present at various positions in the transmission system, the transmission delay changes with a change in transmission amount.

The second problem is associated with the performance of a soft hand-over mechanism. Whether selective synthesis of some soft hand-over processes can be performed within a predetermined processing delay value depends on the performance of each processing mechanism itself and leveling of processing requests.

SUMMARY OF THE INVENTION

It is an object of the present invention to provide a common resource assigning method for a mobile communication system which can suppress variations in transmission delay, and realize processing leveling for a soft hand-over processing function and the like.

It is another object of the present invention to provide a mobile communication resource assigning method which allows reductions in the sizes and weights of an apparatus and a system and improve their performance.

It is still another object of present invention to provide a mobile communication resource assigning method for a mobile communication system which can easily realize efficient transmission of speech frames of variable, low bit rates.

In order to achieve the above objects, according to the present invention, there is provided a common resource assigning method for a mobile communication system constituted by a plurality of radio base stations and a center station connected to the radio base stations and having a plurality of speech processing mechanisms, comprising the steps of setting speech frame groups by grouping speech frames having different phases on radio interfaces, relating the speech processing mechanisms with the set frame groups, and forming speech channels by using the speech frame groups in the radio base stations and the specific speech processing mechanisms related thereto.

BRIEF DESCRIPTION OF THE DRAWINGS

FIG. 1 is a block diagram showing a mobile communication system according to an embodiment of the present invention;

DESCRIPTION OF THE PREFERRED EMBODIMENT

Figure 2:
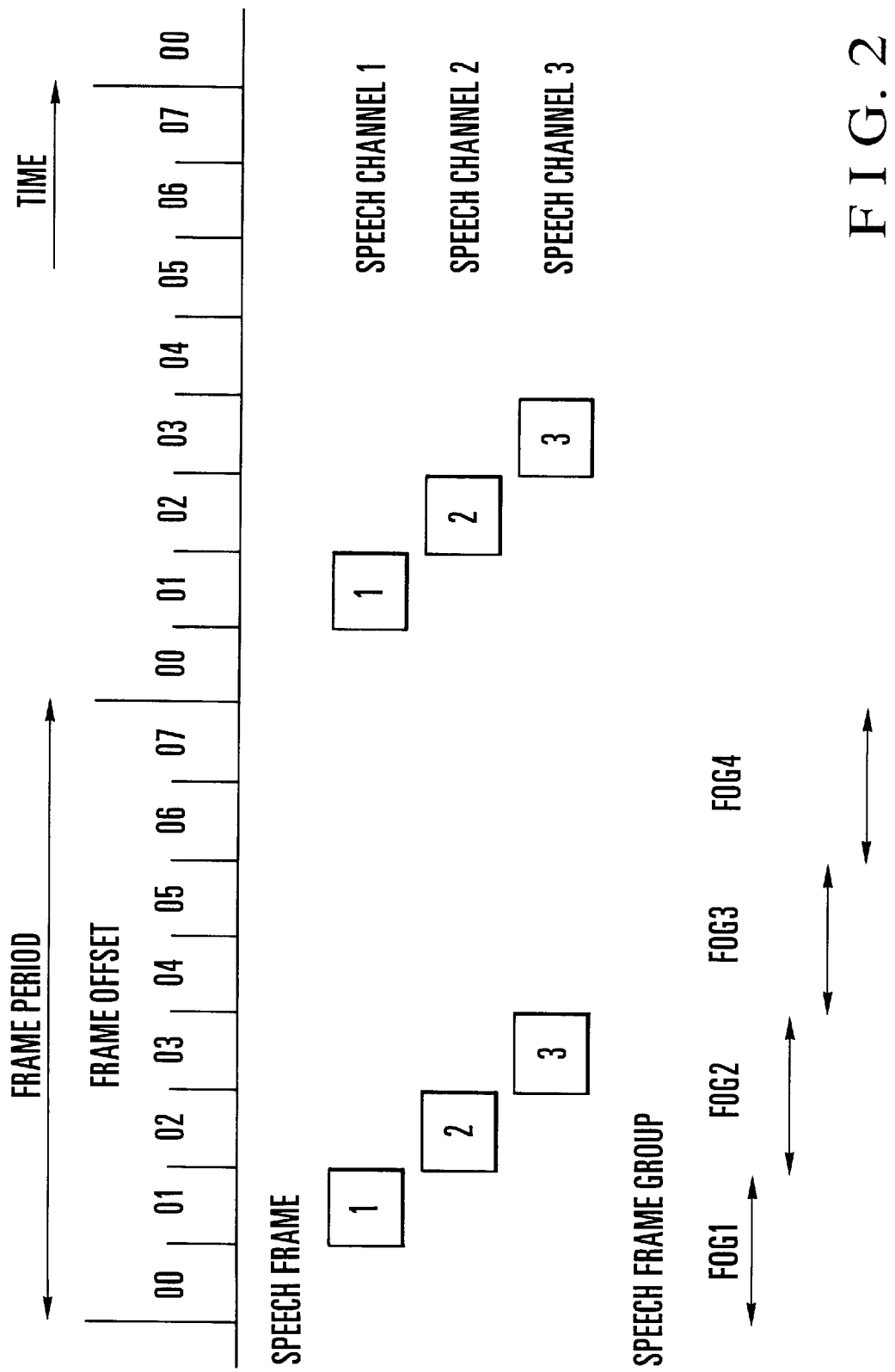
FIG. 2 is a view for explaining how speech frames are grouped.

The present invention will be described in detail below with reference to the accompanying drawings.

FIG. 1 shows a mobile communication system according to an embodiment of the present invention. The mobile communication system is constituted by a plurality of radio base stations (BS1 to BSn) 110 and a center station 100. The center station 100 comprises soft hand-over processing mechanisms (SHO to SHOm) 103, vocoders 104, a plurality of interface circuits 101 to which the radio base stations 110 are connected, a switch mechanism 102 connected between the soft hand-over processing mechanisms 103 and the interface circuits 101, and a switch mechanism 105 connected between the vocoders 104 and other stations (not shown).

The vocoders 104 are constituted by a plurality of vocoder cards VCD1 to VCDm. Each of the vocoder cards VCD1 to VCDm is constituted by a plurality of channels. The respective channels on each of the vocoder cards VCD1 to VCDm are virtually grouped in correspondence with speech frame phase groups obtained by grouping speech frame phases. Referring to FIG. 1, the channels on each of the vocoder cards VCD1 to VCDm are divided into four groups, i.e., frame phase groups (frame offset groups) FOG1 to FOG4.

The soft hand-over processing mechanisms (SHO1 to SHOm) 103 are arranged in correspondence with the vocoder cards VCD1 to VCDm.

Each radio base station 110 has an interface circuit 112. The interface circuit 112 of the radio base station 110 is connected to the corresponding interface circuit 101 of the center station 100 through an external connection path.

The operation of the mobile communication system having the above arrangement will be described in detail next with reference to FIGS. 2 to 4B. FIG. 2 explains how speech frames are grouped. For example, eight phases are set in one frame period.

A speech frame generally transmits/receives one packet in each frame period. For example, speech frame phases are grouped as follows. As shown in FIG. 2, phases "00" and "01" are grouped into speech frame group 1 (FOG1); phases "02" and "03", FOG2; phases "04" and "05", FOG3; and phases "06" and "07", FOG4. In this case, the speech frame phases are divided into four groups. That is, the offset count is 8, and four offset groups (each having two phases) are set. Speech channels 2 and 3 belongs to FOG2.

Figure 3:
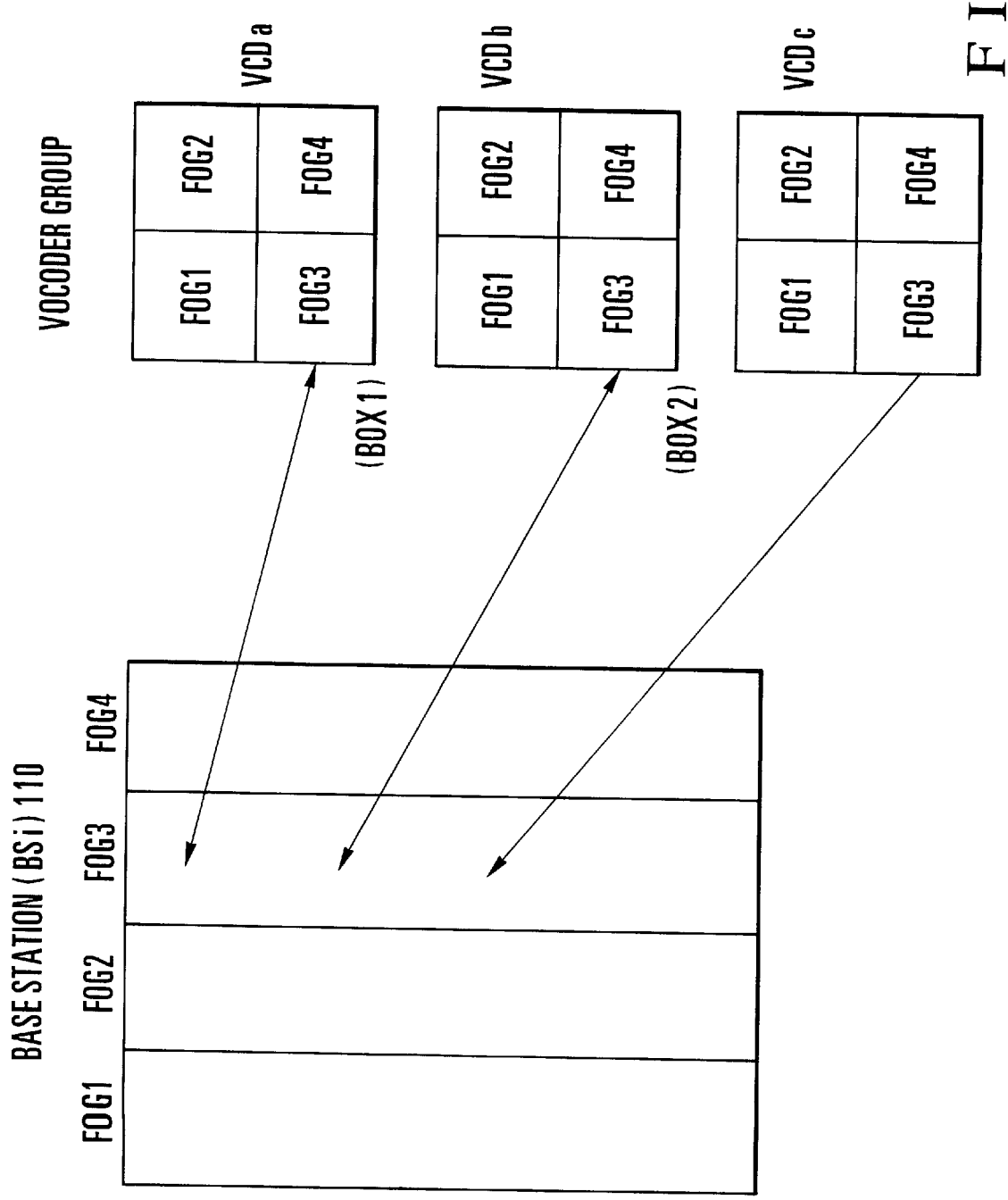
FIG. 3 is a view showing the relationship between the frame phase groups in a base station and the frame phase groups defined on vocoder cards in a center station when speech channels are to be formed.

FIG. 3 shows the relationship between the frame phase groups in the radio base station 110 and the frame phase groups specified on the vocoders 104 in the center station 100 in a case in which a communication channel is formed as a call is generated or hand-over occurs.

In the center station 100, as described above, the vocoder cards (VCD1 to VCDm) 104 and the soft hand-over processing mechanisms (SHO1 to SHOM) 103 are related such that the vocoder card (VCDm) 104 corresponds to one soft hand-over processing mechanism (SHOm) 103.

With this arrangement, the soft hand-over processing mechanism (SHOM) 103 sequentially performs soft hand-over processes for a plurality of channels. For this reason, if many processing requests are received at the same time, requests received later must wait until the processes corresponding to the preceding requests are complete. As a result, the transmission of the speech frame delays.

In general, each radio base station 110 and the center station 100 are installed at some distance from each other and hence are connected through a transmission path. For this reason, the transmission capacity of the transmission path must be set to a value determined in consideration of the maximum communication traffic.

In a packet transmission scheme, therefore, since the number of packet transfer requests varies with time, if the transmission capacity is set in accordance with the maximum number of transfer requests, the transmission capacity to be prepared becomes large, resulting in an increase in operation cost. In contrast to this, in a transmission scheme of setting a queue on a transmission path to level the flow of packets in the process of transmission, as the number of transfer requests increases, the packet transfer delays increase, resulting in a deterioration in communication quality.

In order to solve the above problem, the flow of packets must be leveled when the packets are generated. FIG. 3 shows a leveling method according to the present invention.

As a precondition for leveling, the frame phases in the radio base station 110 have been set to be leveled at the time of channel assignment. This setting can be easily realized by closed processing within the radio base station 110. For example, this operation can be realized by a method of assigning a phase to which the minimum number of channels have been assigned when a call including hand-over is generated.

The relationship between the radio base stations 110 and the vocoders 104 of the center station 100 will be described next. Assume that the radio base stations 110 and the vocoders 104 of the center station 100 are permanently related in one-to-one correspondence. In this case, the flow of packets which is leveled in the radio base station 110 reaches the vocoder 104 without any change, posing no problems in processing in the transmission path and the soft hand-over processing mechanism 103. However, since the radio base stations 110 and the vocoders 104 are arranged in one-to-one correspondence, the vocoder 104 must be arranged in the center station 100 in number corresponding to the sum total of the maximum traffic of the respective base stations.

Since the respective base stations generally vary in traffic, the number of channels of the vocoders 104 used at the same time is considerably smaller than the number of channels prepared. That is, there are many channels in the vocoder 104 which are not used, resulting in a low utilization efficiency.

According to the present invention, when a request to generate a call including hand-over is generated, effective use of the communication resources is realized by relating the channels on the radio base stations 110 to the communication resources of the center station 100, i.e., the vocoders 104 and the soft hand-over processing mechanisms 103 in this case, using the following method. In the case shown in FIG. 3, the base station (BSi) 110 has a capacity of 64 channels, and the frame phases are divided into four groups.

Assume that the vocoder group in the center station 100 is constituted by a plurality of vocoder cards VCDj. Each of the vocoder cards VCDj constitutes a 16-channel vocoder. These 16 channels are divided into four frame offset groups (FOGs). A state in which the respective FOGs of the vocoder card VCDJ (j=1 to 16) have a specific relationship will be referred to as a "BOX".

That is, a BOX can be regarded as a virtual container capable of accommodating the identical channels in the same base station, and is represented by BOX (BSi–VCDj–FOGm). In the case shown in FIG. 3, the BOX has a capacity of four channels.

A method of assigning channels to a BOX will be described next.

(1) First of all, as described above, frame phase setting is performed in the radio base station 110 to perform leveling between the frame phases. With this operation, leveling between the FOGs is performed.

(2) When a request to assign a new channel is generated, a new BOX, i.e., BOX 1 (BSi–VCDa–FOG3) in the case shown in FIG. 3, is set. New channels are then assigned to this BOX. When a call is lost, the channel assignments in the BOX are canceled. Note that a BOX can be allocated to an arbitrary vocoder card (VCDj).

(3) As long as the set BOX has a vacancy, a new channel is assigned to the BOX.

(4) When the BOX (BOX1) is filled to capacity, a next BOX (BOX2) is set, and new channels are assigned to BOX2.

(5) If there are a plurality of BOXs, and a new channel assignment request is generated, a search for a BOX having available channels is made in the order of the ascending ordinal numbers, and channels are assigned to the BOX having available channels.

(6) When all the channels in a BOX are released, the BOX itself is released.

With steps (5) and (6) described above, the number of BOXs set can be decreased.

Figure 4A:
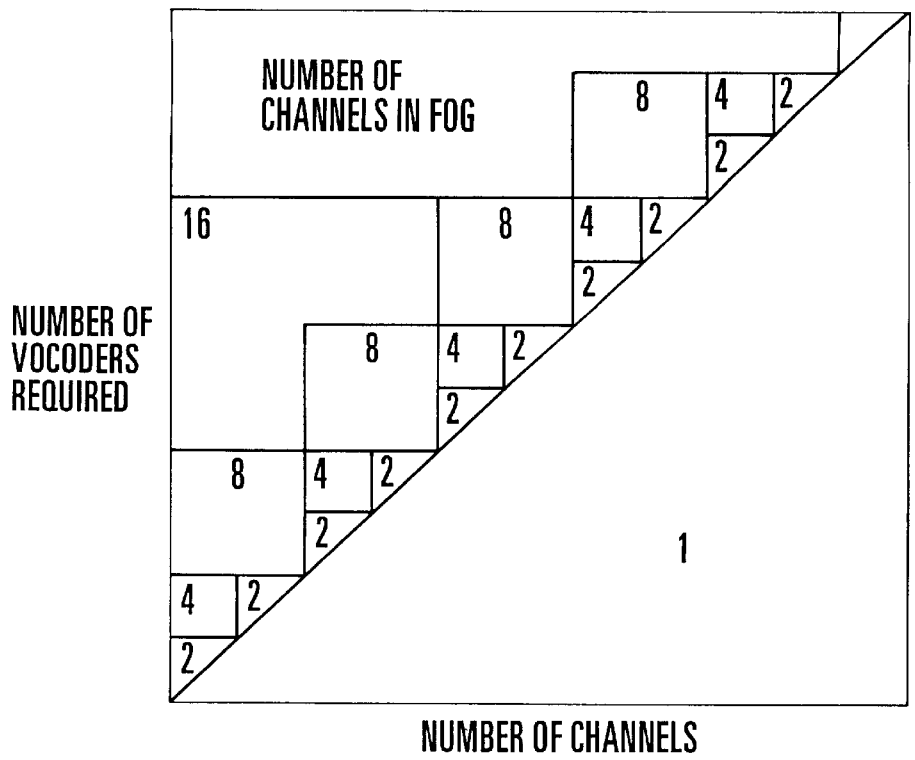
FIGS. 4A and 4B are views showing the numbers of vocoders required when vocoders are to be assigned.
Figure 4B:
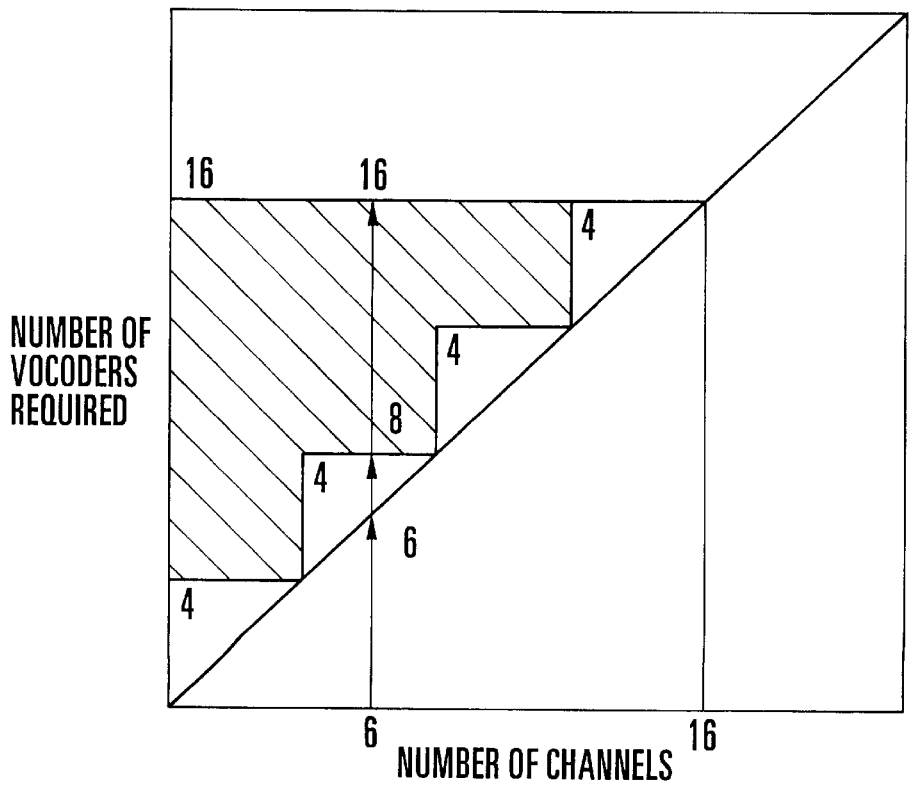

FIGS. 4A and 4B show the number of vocoders required when vocoder assignment is performed. FIG. 4A is the plot of the numbers of vocoders required with respect to the numbers of speech channels with the numbers of channels in the frame offset groups (FOGs) being set as parameters. The numbers of the FOGs are respectively set to 2, 4, 8, and 16. Although the number of speech channels are 1,000 or more in an actual system, only small values are shown to facilitate understanding of channel assignment, i.e., the differences between channel settings.

FIG. 4B shows the numbers of vocoders required when the total number of channels in the base station is 16, and the actual traffic (the number of speech channels) is 6. When the number of channels in an FOG is 1, i.e., vocoder assignment can be freely performed, the number of vocoders required is 6. When the number of channels in the FOG is 4, the number of vocoders required is 8.

Even if, therefore, an FOG group is set, the number of vocoders required can be greatly decreased in proportion to the number of vocoders set (16 in FIG. 4B) in proportion to the number of channels in the base station 110.

The relationship between the above system and a composite cell will be described next. The composite cell may be packeted at the following places:

(1) the interface section (the interface circuits 112 and 101 in FIG. 1) between the base station and the center station; and (2) the soft hand-over processing mechanism (SHO to SHOM) 103 in the center station.

In case (1), the load on the composite cell processing section, e.g., the buffer capacity and the processing delay, can be reduced by leveling the flow of packets.

In case (2), a composite cell can be easily realized by the same hardware resources using a method of sharing the same packet between a plurality of channels in units of frame phase groups.

Each vocoder card (VCD1 to VCDm) 104 is used in the physical form of an increment/decrement unit. However, the present invention is not limited to this.

In the addition, the FOGs in each vocoder need not be physically separated. For example, when a multichannel vocoder is constituted by one DSP (Digital Signal Processor), different FOGs can be formed in the same DSP. In contrast to this, when different FOGs are formed in the DSP, the processing by the DSP can be made uniform.

As has been described above, according to the present invention, a constant phase difference can be maintained between speech frames transmitted/received through a radio interface at predetermined time intervals. For example, according to the U.S. TIA CDMA standards (IS-95), 16 phases are set in each of speech frames having a period of 20 ms.

In the present invention, the speech frames having this phase difference are grouped, and the speech processing mechanisms are independently arranged in correspondence with the speech frame groups. In this case, a "speech processing mechanism" includes a vocoder and soft hand-over processing mechanism.

According to the present invention, upon generation of a call (including formation of a new channel in hand-over), speech channels are formed by using channels for a specific speech frame group in the radio interface and channels in a specific speech processing mechanism unit which can be set at an arbitrary position of a speech processing mechanism in the center station, thereby assigning the mobile communication resources.

The present invention has the following effects.

The first effect of the present invention is that the transmission quality can be improved. This condition is strongly required for a speech path that is required to transmit speech data or the like in real time. The reason is as follows. In a transmission scheme using packets, there are queues at various places in the transmission system. When the communication traffic varies, a transmission delay occurs as the traffic increases. In the present invention, variations in transmission delay can be suppressed by leveling frame phases.

The second effect of the present invention is that the communication resources such as the soft hand-over processing mechanisms can be efficiently used, and the amount of communication resources to be prepared for the same traffic can be reduced. This is because, in the present invention, the throughput within a predetermined processing delay (including a processing wait time) allowable range by leveling the processing can be increased.

The third effect of the present invention is that the amount of communication resources such as vocoders and soft hand-over processing mechanisms can be reduced. This is because, in the present invention, the communication resources can be shared to obtain great effects by grouping speech frame phases.

The fourth effect is that the method of efficiently transmitting speech frames at variable and low bit rates can be easily realized. This is because, in the present invention, the method of sharing the same packet between a plurality of channels in units of frame phase groups can be easily realized as a method of using a composite cell as the interface between each base station and the center station.

What is claimed is:

1. A common resource assigning method for a mobile communication system constituted by a plurality of radio base stations and a center station connected to said radio base stations and having a plurality of speech processing mechanisms, comprising the steps of:

setting speech frame groups by grouping speech frames having different phases on radio interfaces;

relating said speech processing mechanisms with the set speech frame groups; and forming speech channels by using the speech frame groups in said radio base stations and said speech processing mechanisms related thereto, wherein the step of forming the speech channels comprises the steps of:
    setting a BOX which defines a relationship between said radio base station, said speech processing mechanism, and the speech frame groups in response to an assignment request, the BOX having a capacity of a predetermined number of speech frames;
    when an already set BOX has a vacancy, assigning channels to the BOX until the BOX is filled to capacity; and
    when the already set BOX is filled to capacity, setting a new BOX in response to a channel assignment request.

2. A method according to claim 1, wherein said speech processing mechanism related to a specific speech frame group in said radio base station is mounted at an arbitrary position of a common speech processing mechanism in said center station.

3. A method according to claim 1, wherein the speech processing mechanism unit comprises at least one of a soft hand-over processing mechanism and a vocoder.

4. A method according to claim 1, wherein the step of forming the speech channels further comprises the steps of:
    when a call is lost, canceling a corresponding channel assignment in the BOX;
    when a plurality of BOXs are set, assigning a channel to a first BOX having an available channel in the setting order in response to a channel assignment request; and
    when all channels in a BOX are released, canceling the BOX from which all the channels have been released.

5. A method according to claim 4, wherein the step of forming the speech channels further comprises the steps:
    transmitting speech frames from said radio base station to said center station in a packet form, and leveling the flow of packets in said radio base station.

* * * * *